United States Patent
Zhu et al.

(10) Patent No.: US 10,668,925 B2
(45) Date of Patent: Jun. 2, 2020

(54) DRIVER INTENTION-BASED LANE ASSISTANT SYSTEM FOR AUTONOMOUS DRIVING VEHICLES

(71) Applicant: Baidu USA LLC, Sunnyvale, CA (US)

(72) Inventors: Fan Zhu, Sunnyvale, CA (US); Qi Kong, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 248 days.

(21) Appl. No.: 15/695,885

(22) Filed: Sep. 5, 2017

(65) Prior Publication Data

US 2019/0071091 A1  Mar. 7, 2019

(51) Int. Cl.
| | | |
|---|---|---|
| *G01C 22/00* | (2006.01) | |
| *G05D 1/00* | (2006.01) | |
| *B60W 30/18* | (2012.01) | |
| *B60W 30/12* | (2020.01) | |
| *G08G 1/16* | (2006.01) | |
| *A01B 69/00* | (2006.01) | |
| *B62D 6/00* | (2006.01) | |
| *B62D 11/00* | (2006.01) | |
| *B62D 12/00* | (2006.01) | |
| *B63G 8/20* | (2006.01) | |
| *B63H 25/04* | (2006.01) | |
| *G06F 7/00* | (2006.01) | |
| *G06F 17/00* | (2019.01) | |
| *G06K 9/00* | (2006.01) | |

(52) U.S. Cl.
CPC ...... *B60W 30/18163* (2013.01); *B60W 30/12* (2013.01); *G08G 1/166* (2013.01); *G08G 1/167* (2013.01); *B60W 2520/06* (2013.01); *B60W 2540/20* (2013.01); *B60W 2550/10* (2013.01); *B60W 2550/14* (2013.01); *B60W 2550/302* (2013.01); *B60W 2720/24* (2013.01)

(58) Field of Classification Search
CPC ............ B60W 30/18163; B60W 30/12; G08G 1/166; G08G 1/167; G06F 7/00; B62D 6/00; G06K 9/00798
USPC ...................... 701/23, 42; 382/104
See application file for complete search history.

(56) References Cited

U.S. PATENT DOCUMENTS

| | | | |
|---|---|---|---|
| 2013/0253767 A1* | 9/2013 | Lee ......... | B60W 50/04 701/42 |
| 2015/0117714 A1* | 4/2015 | Okuda ........ | G08G 1/167 382/104 |
| 2017/0113664 A1* | 4/2017 | Nix ......... | G07C 5/0891 |
| 2019/0122559 A1* | 4/2019 | Zhang ....... | G08G 1/167 |

* cited by examiner

*Primary Examiner* — Mahmoud S Ismail
(74) *Attorney, Agent, or Firm* — Womble Bond Dickinson (US) LLP

(57) ABSTRACT

In one embodiment, a lane assistant system is configured to provide lane assistance to a driver of an autonomous driving vehicle (ADV) based on the driver's intention determined at the point in time by capturing and analyzing user actions and driving environment surrounding the ADV. By analyzing the user actions and the driving environment surrounding the vehicle, the driver's intention can be determined. The driver's intention can be utilized to interpret whether the driver indeed intends to change lane. Based on the driver's intention, the lane assistance can be provided, either allowing the vehicle change or exit the current lane, or automatically providing warning or correction of the moving direction of the vehicle.

22 Claims, 10 Drawing Sheets

DRIVER INTENTION-BASED LANE ASSISTANT SYSTEM FOR AUTONOMOUS DRIVING VEHICLES

TECHNICAL FIELD

Embodiments of the present disclosure relate generally to operating autonomous vehicles. More particularly, embodiments of the disclosure relate to a lane assistant system for autonomous driving vehicles.

BACKGROUND

Vehicles operating in an autonomous mode (e.g., driverless) can relieve occupants, especially the driver, from some driving-related responsibilities. Typically, an autonomous driving vehicle can operate in a complete autonomous mode, a semi-autonomous mode, or a manual mode. When operating in an autonomous mode, the vehicle can navigate to various locations using onboard sensors, allowing the vehicle to travel with minimal human interaction or in some cases without any passengers. When operating in a semi-autonomous mode, a driver of the vehicle can take over the driver at certain points while the vehicle can operate autonomously in other time. When operating in a manual mode, the driver take full control of the vehicle in all time.

One of the important features of autonomous driving is a lane assistant system or lane departure warning or assistant system. A lane assistant system is a mechanism designed to warn or assist the driver when the vehicle begins to move out of its lane on freeways and arterial roads, especially when the vehicle is operating in a semi-autonomous mode. These systems are designed to minimize accidents by addressing the main causes of collisions: driver error, distractions and drowsiness. Typical lane assistance is provided based on the relative moving direction of a vehicle with respect to the line marking painted on the lane to determine whether a vehicle is drifting out of the current lane. However, such a determination does not always accurately catch driver's intention (e.g., whether the driver indeed wants to change lane or exit the lane). If the lane assistant system attempts to automatically correct the vehicle moving direction against the driver's actual intention, it may cause an uncomfortable or unsafe situation.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
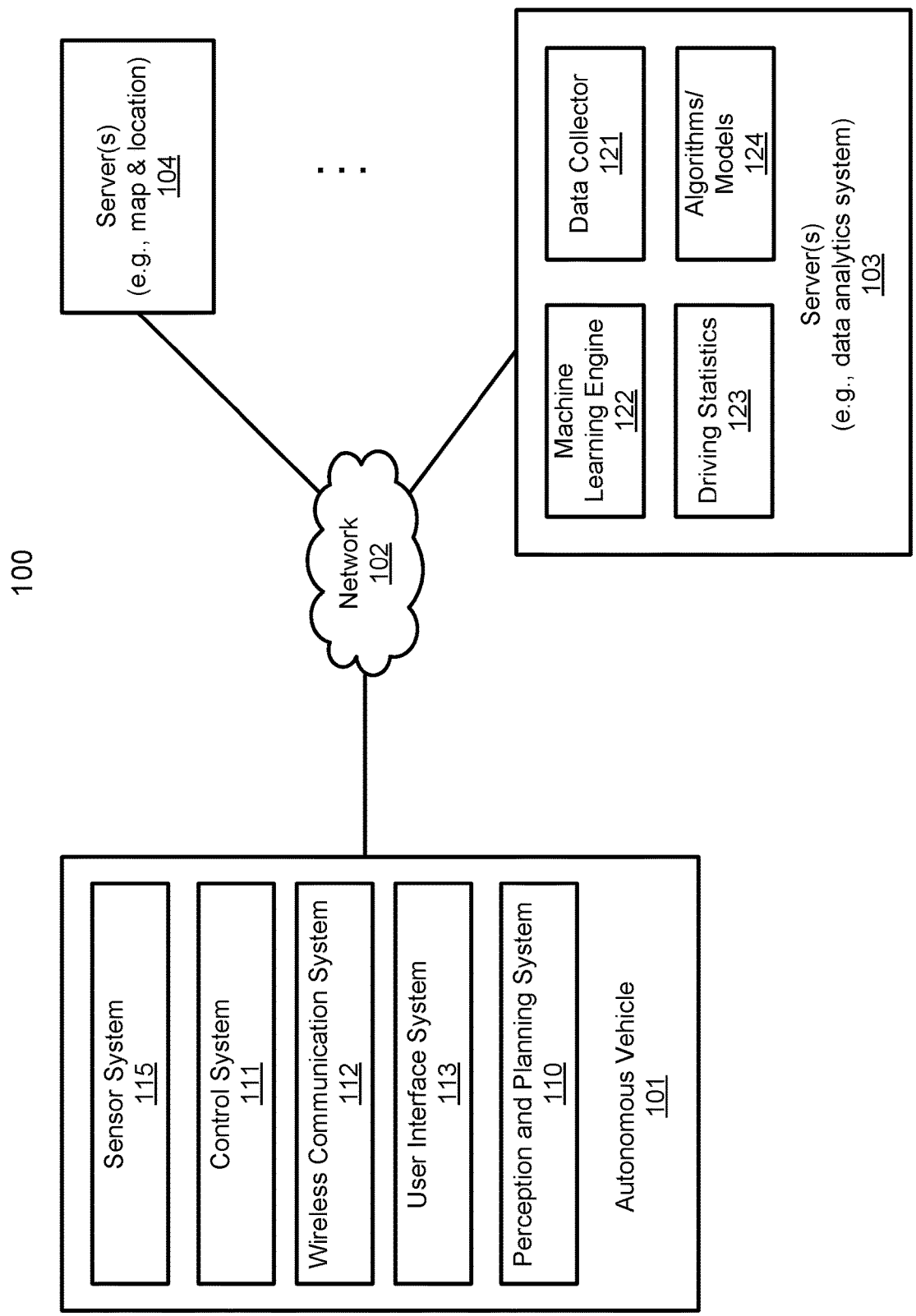
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to an aspect of the invention, a lane assistant system is configured to provide lane assistance to a driver of an autonomous driving vehicle (ADV) based on the driver's intention determined at the point in time by capturing and analyzing user actions and driving environment surrounding the ADV. By analyzing the user actions and the driving environment surrounding the vehicle, the driver's intention can be determined. The driver's intention can be utilized to interpret whether the driver indeed intends to change lane. Based on the driver's intention, the lane assistance can be provided, either allowing the vehicle change or exit the current lane, or automatically providing warning and/or correction of the moving direction of the vehicle to keep the vehicle remained in the lane.

According to one embodiment, it is detected that an autonomous driving vehicle is operating in a semi-autonomous mode and the vehicle is drifting towards an edge or side of the current lane. In response to such a detection, one or more user actions of a driver of the vehicle are determined. In addition, a driving environment surrounding the vehicle is captured and perceived or recognized using one or more sensors mounted on the vehicle. The driving environment includes information describing or indicating the lane configuration of the lane in which the vehicle is operating, as well as the associated traffic condition. A user intention of the driver is determined based on the user actions of the driver and the driving environment surrounding the vehicle. The vehicle is allowed to continue drifting or leaving the current lane if it is determined that the user intention is to leave the current lane intentionally. Otherwise, a lane assistance is provided to the driver, for example, either providing a warning and/or providing automatic correction to correct moving direction of the vehicle so that the vehicle will remain in the lane.

In one embodiment, if a turn signal has been turned on indicating a lane changing direction conforming to the drifting direction of the vehicle, it is determined that the driver intends to change lane. According to another embodiment, route and map data associated with the current lane is examined to determine whether there is another lane adjacent to the current lane on the same side to which the vehicle is drifting. It is determined the driver does not intend to change lane if there is no adjacent lane available based on the route and map data. According to another embodiment, if there is a continuing path extended from the current lane as a part of exit lane of the current lane on the same side to which the vehicle is drifting, the driver would likely intend to change or exit lane. According to another embodiment, if there is another vehicle moving at a blind spot of the current vehicle of an adjacent lane to which the vehicle is drifting, the driver does not likely intend to change lane. According to another embodiment, if there is an object in front of the vehicle is its speed is much slower than the speed of the vehicle, the driver of the vehicle likely intends to change lane. According to a further embodiment, if the road surface ahead of the vehicle is rough, the driver may be considered to intentionally change lane.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
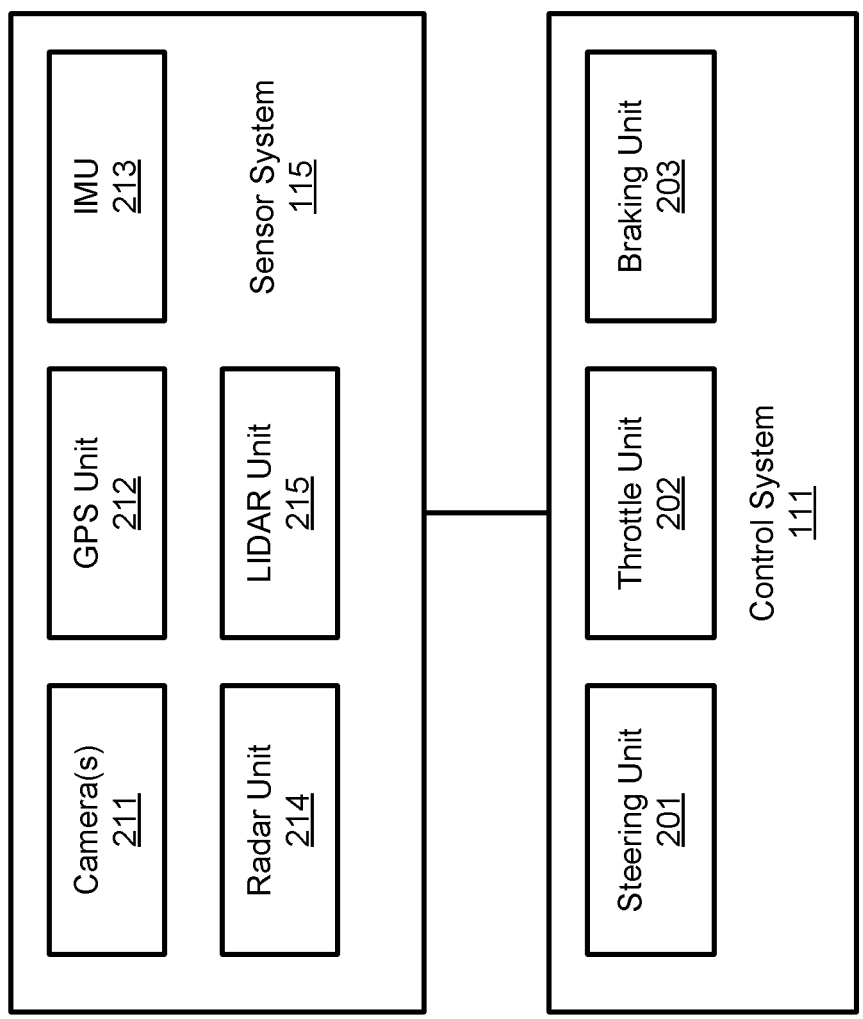
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles, semi-autonomous vehicle, or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc. Based on driving statistics 123, machine learning engine 122 generates or trains a set of rules, algorithms, and/or predictive models 124 for a variety of purposes.

In one embodiment, the collected driving statistics may include certain driving scenarios in which vehicles change lanes under different driving environments and the user actions performed by the drivers at the point in time. When a vehicle changes lane, machine learning engine 122 examines the user actions at the point in time to derive the user intention of lane changing. That is, for each of the vehicles identified from driving statistics 123, given a known lane changing obtained from driving statistics 123, machine learning engine 120 learns the known user actions of the driver to derive certain user actions that should be considered as intentional actions for lane changing.

Similarly, given the known driving scenario in which a vehicle drifts towards a side of a lane and certain user actions or autonomous vehicle actions (e.g., by lane assistant system) were performed to avoid further lane departure, machine learning engine 120 may learn that under certain user actions and/or driving environments, the driver does not intentionally change lane. Such machine learning operations can be developed into a set of rules or user intention prediction models 124 to determine user intentions at different driving scenarios based on a combination of user actions and/or driving circumstances at the point in time. The user intention determination rules or models 124 can then be uploaded onto the vehicles for determining the user intention for lane changing at real-time.

Figure 3A:
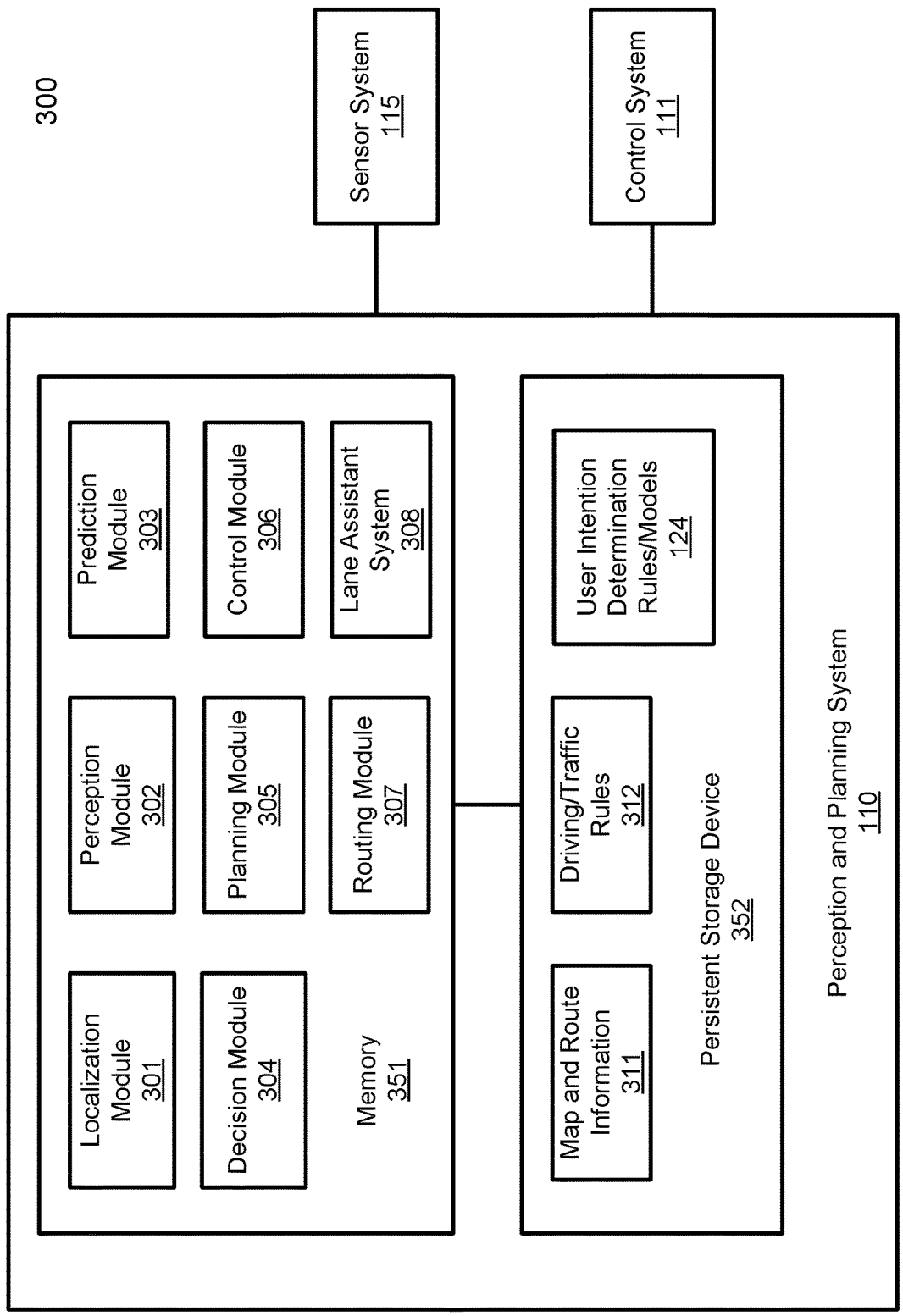
FIGS. 3A-3B are block diagrams illustrating an example of a perception and planning system used with an autonomous vehicle according to one embodiment.
Figure 3B:
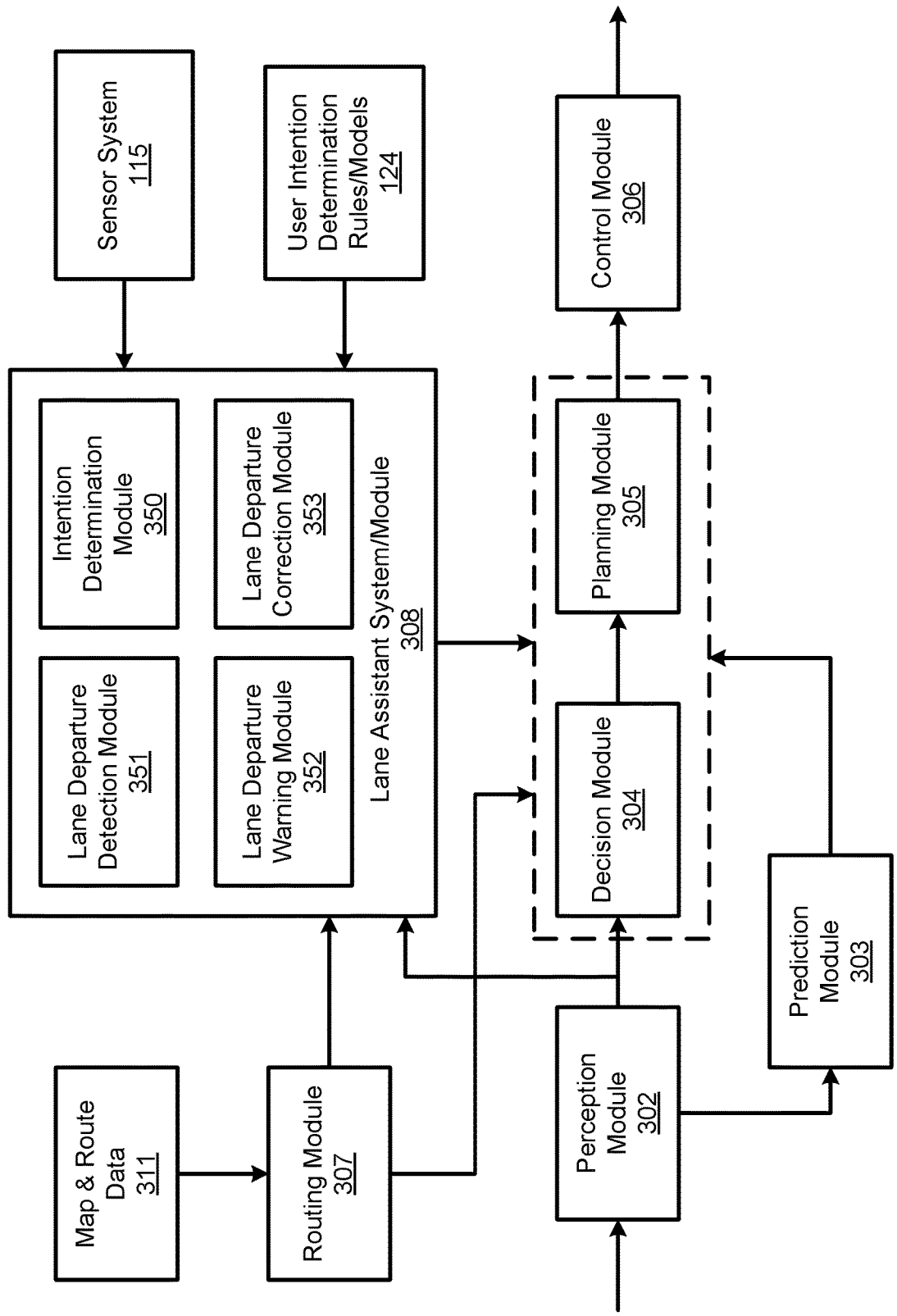

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and lane assistant system or module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together into fewer integrated modules.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a topographic map for each of the routes it determines from the starting location to reach the destination location. The topographic maps are then provided to decision module 304 and/or planning module 305. Decision module 304 and/or planning module 305 examines all of the possible routes to select one of the most optimal route in view of other data provided by other modules such as traffic conditions from localization module 301, driving environment perceived by perception module 302, and traffic condition predicted by prediction module 303.

Based on a decision for each of the objects by decision module 304 and routing information provided by routing module 307, planning module 305 plans a path or route for the autonomous vehicle, as well as driving parameters (e.g., distance, speed, and/or turning angle). That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

According to one embodiment, lane assistant system or module 308 is configured to provide lane assistance service to decision module 304 and/or planning module 305. Similar to a conventional lane departure system, when an ADV is drifting towards to a side of the lane in which the ADV is driving, lane assistant system 308 may generate a warning message to alert the driver of the ADV. If the driver of the ADV does not take any correction actions, lane assistant system 308 may automatically take a correction action to prevent the ADV from further drifting away from the center line of the lane. A conventional lane assistant system detects that the vehicle is drifting to the side of the lane solely based on lane marking painted on the surface of the road (e.g., painted lines on the road). If the moving direction of the vehicle is not aligned with the lane markings, the system will consider that the driver is unintentionally leaving the lane. However, in some cases, there may be a user intention to exit or change lane. The convention method is not accurate under such circumstances, because it does not take into consideration of driver's intention and other circumstantial factors other than the lane markings.

According to one embodiment, in addition to determining whether a vehicle is drifting off the center line of a lane based on the lane marking or line marking painted on the road, lane assistant system 108 determines whether the driver of the vehicle intends to change lane or exit lane based on user actions and the driving environment surrounding the vehicle. In one embodiment, lane assistant system 308 includes user intention determination module 350, lane departure detection module 351, lane departure warning module 352, and lane departure correction module 353. Lane departure detection module 351 is coupled to a variety of sensors such as cameras, lasers, infrared sensors as shown in FIG. 2 to detect whether the vehicle is drifting off the center line of the current lane towards to an edge or side of the current lane. Lane departure detection module 351 compares the moving direction of the vehicle against the lane markings such as lines that divide the lanes or lines indicating boundaries of the lanes.

Once lane departure detection module 351 detects that the vehicle is drifting away from the center line of the lane, user intention determination module 350 is invoked to determine whether the driver of the vehicle intentionally drives the vehicle off the lane based user actions of the driver and the driving environment surrounding the vehicle at the point in time. In one embodiment, one simple indication of intentional leaving the current lane is whether a turn signal of the vehicle has been turned on that is consistent with the drifting direction of the vehicle. For example, if the vehicle is drifting off the center line and moving towards the right side of the lane while a right turn signal has been turned on, the driver of vehicle may be considered to intentionally change lane from the current lane to an adjacent lane on the right hand side or exit the current lane on the right hand side.

Figure 4A:
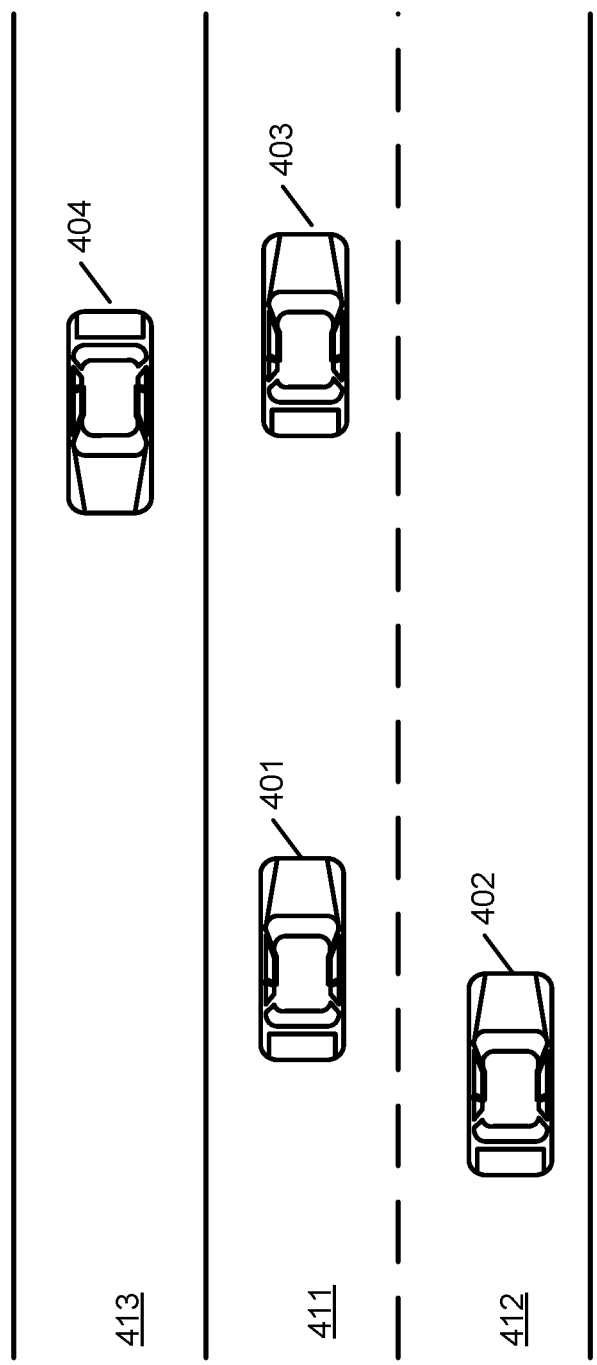
FIGS. 4A-4C are diagrams illustrating certain driving scenarios which may be used with embodiments of the invention.

According to one embodiment, if the turn signal has not been turned on the user intention may be determined based on other factors, which may be determined based on the driving environment surrounding vehicle such as lane configuration and/or objects nearby on the roads, etc. For example, referring to now to FIG. 4A, it is assumed the ADV 401 is driving in lane 411 and there are two adjacent lanes 412 and 413 on the right side and left side respectively. When lane departure detection module 351 of lane assistant system 308 detects that ADV 401 is drifting towards lane 412 on the right side, user intention detection module 350 determines whether there is another lane on the same side to which ADV 401 is drifting. In this example, there is another lane 412 is available adjacent to the current lane 411. Thus, user intention determination module 350 may determine that ADV 401 is intentionally moving to the right side in an attempt to change lane from current lane 411 to adjacent lane 412. The lane configuration may be determined based on route and map information of the road and/or the perception of the driving environment captured by the sensors (e.g., cameras) at the point in time. If lane 412 does not exist, the lane changing is considered unintentional.

Figure 4B:
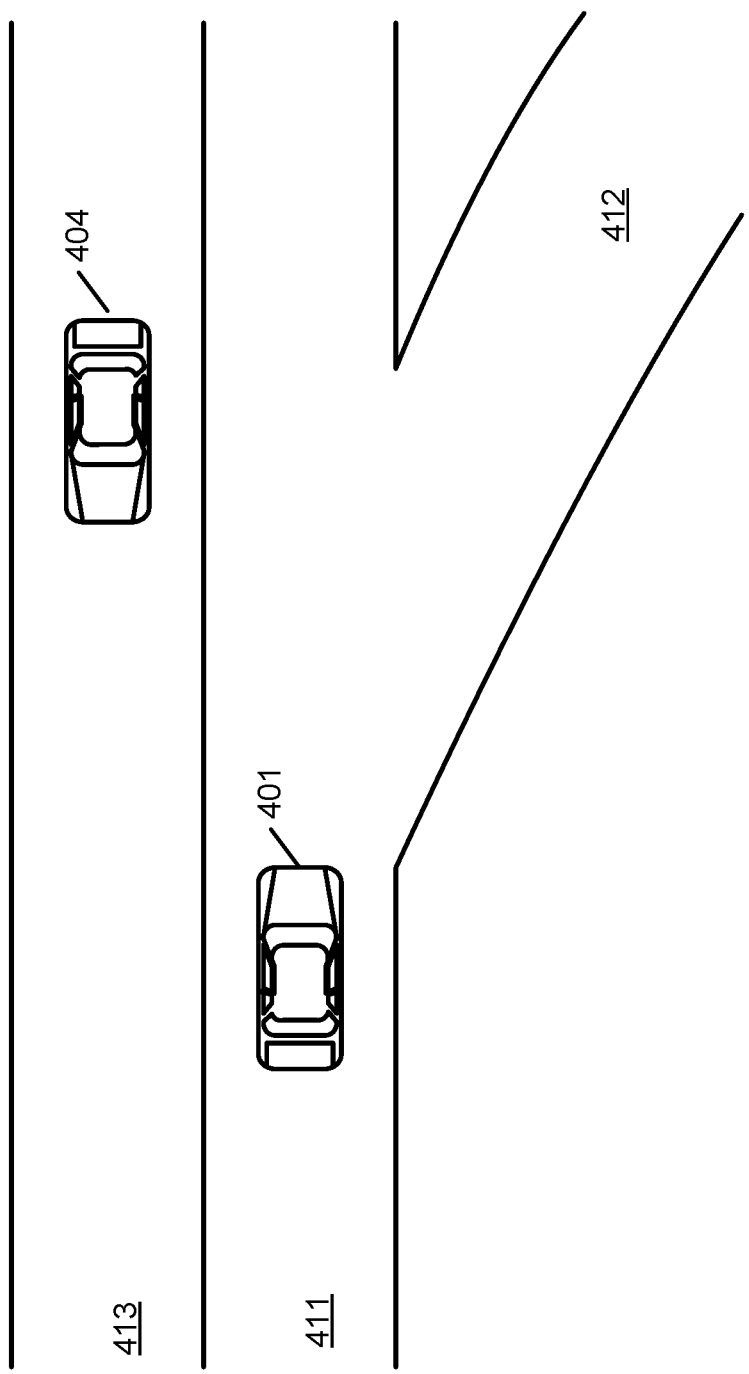
Figure 4C:
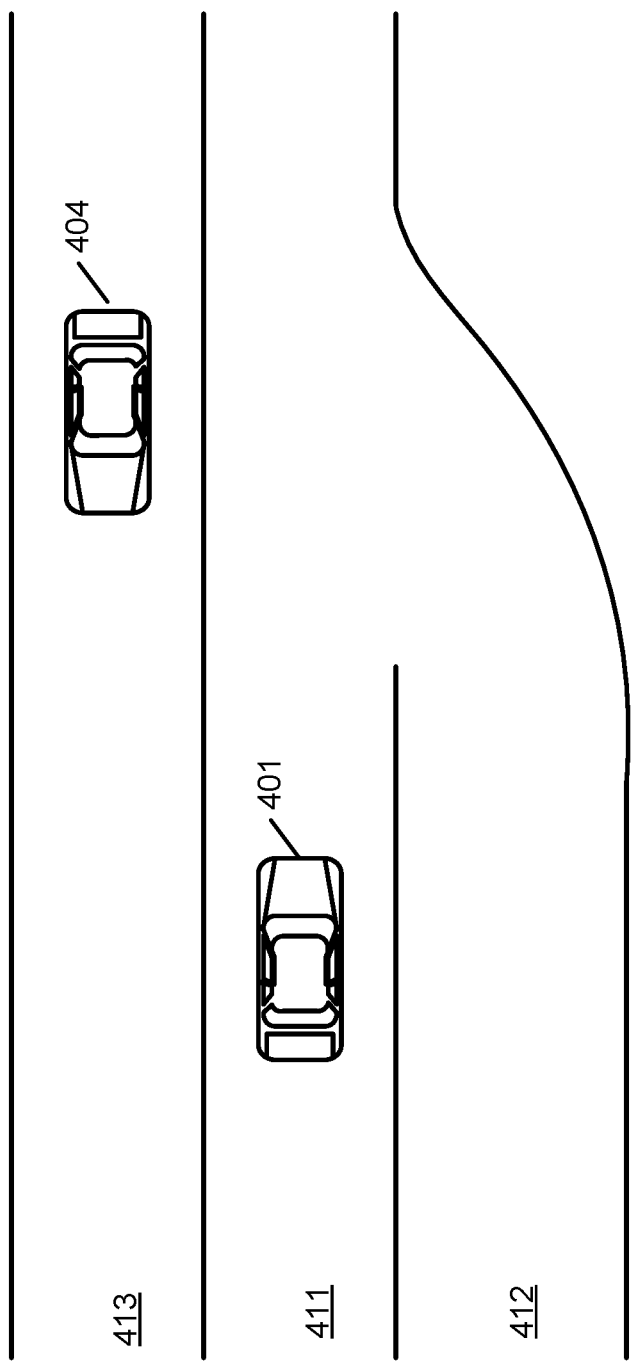

If lane 412 is determined available, according to one embodiment, the configuration of lane 412 and/or the traffic activities of lane 412 may be examined to further confirm the user intention. For example, if lane 412 is determined to be extended from lane 411 as a part of exiting lane as shown FIG. 4B, the driver of ADV 401 is more likely to intentionally exit lane 411 onto exiting lane 412. However, if it is determined that lane 412 is about to merge left into lane 411 ahead, it is more likely the driver of ADV 401 does not intend to change lane from lane 411 into lane 412.

In addition to the lane configuration, in one embodiment, traffic condition of lane 412 (e.g., target lane) to which the vehicle is changing may also be considered as a factor in determining whether the driver intends to change lane. For example, when ADV 401 is drifting towards lane 412, user intention determination module 350 determines whether there is another vehicle such as vehicle 402 moving at a blind spot with respect to ADV 401 via a blind spot sensor. If there is another vehicle located within a predetermined proximity of a blind spot, it is unlikely the driver of ADV 401 intends to change lane. Similarly, if there is another vehicle moving in lane 412 from behind closing in on ADV 401 at a significant higher speed than the speed of ADV 401, it is unlikely the driver of ADV 401 intends to change lane from lane 411 to lane 412, because such lane changing may cause collision.

The above scenarios are determined based on a vast majority of driver behaviors or common sense driving collected from many vehicles driven by many drivers and "learned" using machine learning into a set of rules or models as part of intention determination rules or models 124. According to another embodiment, the user intention may also be determined based on the traffic law. For example, if ADV 401 is detected to drift towards lane 413, where lane 413 has opposite traffic and the line separating lanes 411 and 413 is a solid line or double solid lines, according to common traffic law, vehicles are not supposed to change lane across solid line(s). Under such a driving circumstances, user intention determination module 350 may determine that the driver of ADV 401 does not intend to change lane from lane 411 to lane 413. Similarly, if there is another vehicle such as vehicle 404 approaching ADV 401 on lane 413, it is unlikely the driver of ADV 401 intends to change lane from lane 411 to lane 413 because it may cause a traffic accident.

According to a further embodiment, if it is determine there is an object in front of ADV 401, in this example, object 403, moving at a speed that is significantly slower than the speed of ADV 401, it is likely the user intends to change lane to go around the object. Object 403 may be an obstacle (e.g., luggage dropped off from another vehicle) statically disposed within lane 411. Object 403 may be another vehicle moving at a significant slower speed. Similarly, if it is detected that lane 411 has a rough lane surface ahead of ADV 401, it is likely that the driver of ADV 401 intends to change lane. The rationale behind is the driver of ADV 401 intends to avoid run into object 403 or the rough lane surface.

Referring back to FIGS. 3A-3B, once the user intention of the driver has been determined as unintentional, lane departure warning module 352 may alert the driver of the vehicle. If the driver of the vehicle does not react within a predetermined period of time, lane departure correction module 353 may send a signal to decision module 304 and/or planning module 305 to plan and control the vehicle to perform a correction action to cause the vehicle remaining within the current lane.

Figure 5:
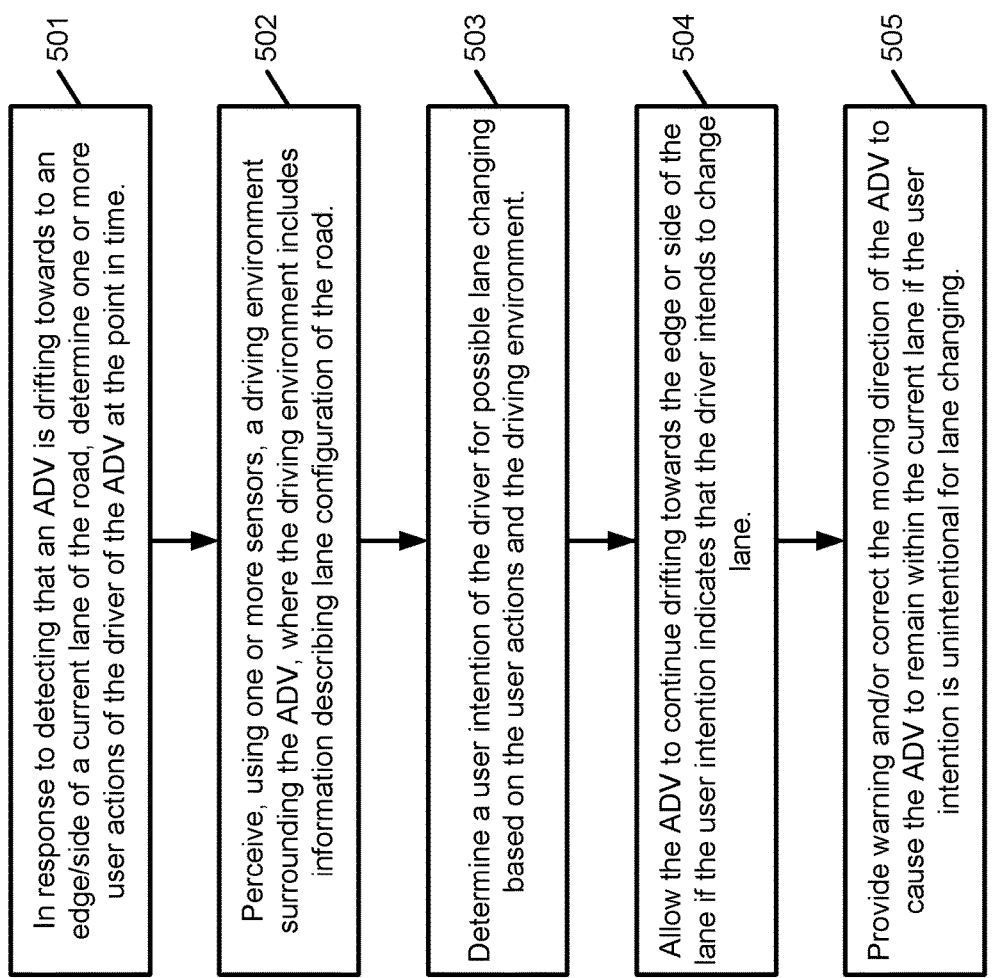
FIG. 5 is a flow diagram illustrating a process of providing lane assistance to autonomous driving vehicles according to one embodiment.

FIG. 5 is a flow diagram illustrating a process of providing lane assistance to an autonomous driving vehicle according to one embodiment. Process 500 may be performed by processing logic which may include software, hardware, or a combination thereof. For example, process 500 may be performed by lane assistant system 308. Referring to FIG. 5, in operation 501, processing logic detects that an ADV is drifting towards an edge or a side of a current lane of a road in which the vehicle is moving. Such drifting can be detected based on perception information perceiving a driving environment of the vehicle by a variety of sensors (e.g., cameras, laser, LIDAR, infrared). Processing logic may compare a sequence of images or video frames of the lane in view of the relative moving direction of the vehicle to detect whether the vehicle is drifting off the center line of the lane and leaving the lane eventually. In response, processing logic determines one or more user actions performed by a driver of the vehicle at the point in time and prior to the detection of drifting. The ADV may be driven in a semi-autonomous mode during which a driver may take over for some manual driving operations.

In operation 502, processing logic perceives, using one or more sensors mounted on the ADV, a driving environment surrounding the ADV. The perceived driving environment includes information describing the lane configuration of the road, including a number of lanes in the road and possible traffic condition of the road, etc. In operation 503, processing logic determines a user intention of the driver regarding whether the driver intends to change lane based on the user actions and the perceived driving environment. If it is determined that the driver intends to change lane, in operation 504, processing logic allows the ADV continuing to drift off the center line of the lane for possible lane changing or lane exiting. Otherwise, in operation 505, processing logic automatically modifies a moving direction of the ADV to move away from the edge of the lane and to remain within the lane.

Figure 6:
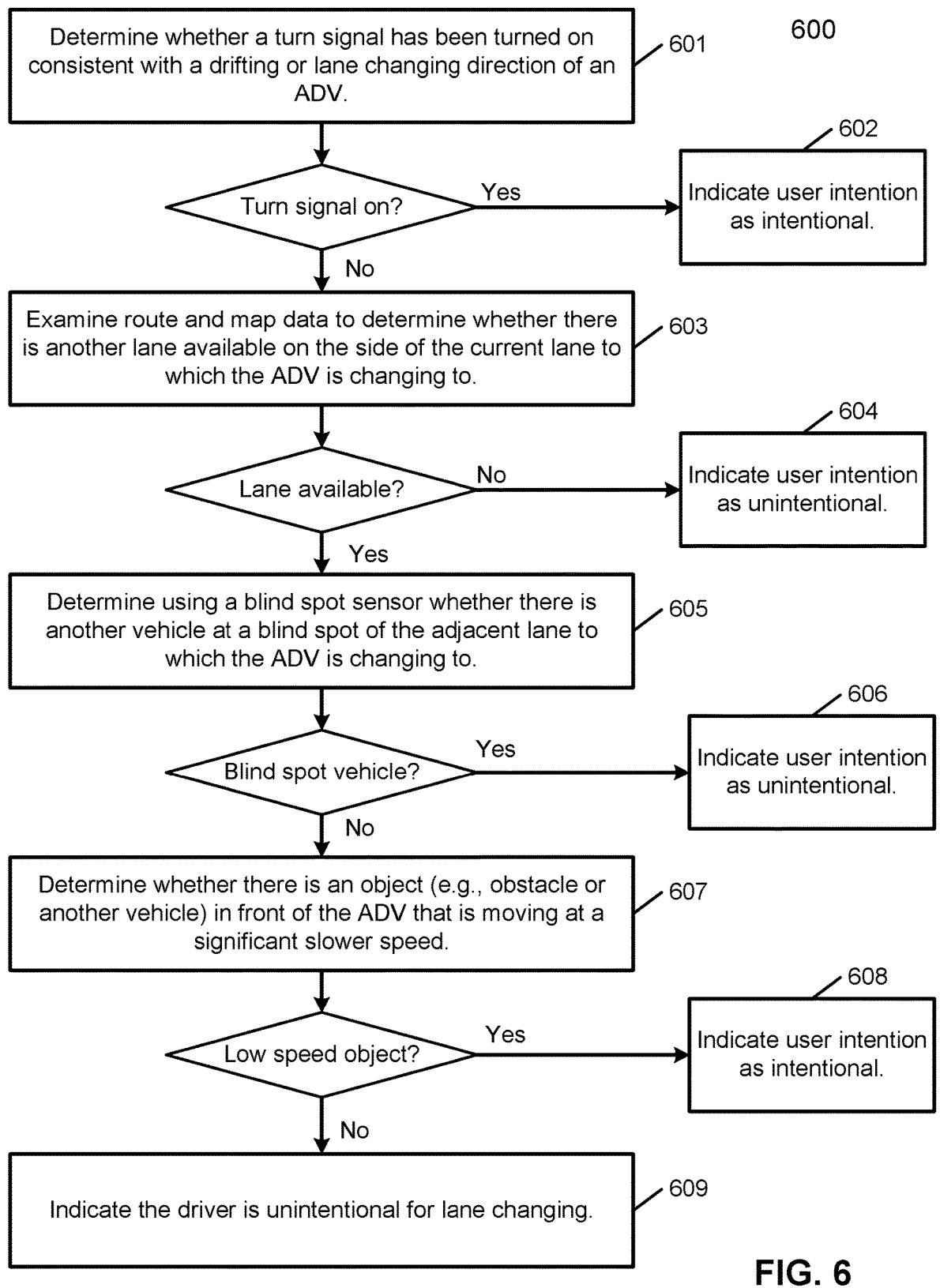
FIG. 6 is a flow diagram illustrating a process of determining user intention for possible lane changing according to one embodiment.

FIG. 6 is a flow diagram illustrating a process of determining user intention for possible lane changing of an autonomous driving vehicle according to one embodiment. Process 600 may be performed by processing logic which may include software, hardware, or a combination thereof. For example, process 600 may be performed user intention determination module 350. Process 600 may be performed as a part of operation 503 of FIG. 5. Referring to FIG. 6, in response to detecting that a vehicle is drifting off a center line and towards a side of a current lane, processing logic determines whether a turn signal has been turned on in accordance with a drifting direction of the vehicle. For example, if the vehicle is drifting towards to the right side of the lane and a right turn signal has been turned on by the driver, in operation 602, it is considered the driver intends to change lane.

In operation 603, processing logic examines the route and map information associated with the road in which the vehicle is moving to determine whether there is another lane available on the same side of lane to which the vehicle is drifting. For example, if the vehicle is drifting towards to the right side of the lane, processing logic determines based on the route and map information whether there is a lane adjacent to the current lane on the right side. If there is no lane available on the same side of drifting of the vehicle, in operation 604, it is determined that the driver does not intend to change lane.

If there is a lane available on the same side of the vehicle drifting, the driver may intend to change lane, however, a further confirmation may be needed. In operation 605, processing logic determines whether there is another vehicle at a blind spot of the ADV within the adjacent lane via a blind spot sensor. If there is no vehicle within a predetermined proximity of the blind spot, in operation 606, the user intention of the driver is considered unintentional for lane changing. In one embodiment, if there is another vehicle quickly approaching from behind within the adjacent lane, the user intention may be considered as unintentional for lane changing as the other vehicle may collide with the ADV if lane changing occurs. Similarly, if there is another vehicle ahead of the ADV within the adjacent lane, but is moving at a much lower speed than the speed of the ADV, the user intention may be considered as unintentional as the ADV may collide with the other vehicle if it changes lane. Further, if the adjacent lane will merge with the current lane ahead, the user intention may be considered as unintentional because the adjacent lane will soon end up with the current lane. Even if there is no adjacent lane available, if there is a relatively flat area on the same side based on the perception data that is large enough to stop a vehicle and the ADV rapidly slows down while exiting the current lane, the driver may attempt to make an emergency stop on the side of the road. In such a driving scenario, the user intention of the driver may be considered as intentional.

In operation 607, processing logic determines whether there is an object in front of the ADV within the current lane that is moving at a speed that is significantly slower than the speed of the ADV. That is, whether the difference between the speed of the ADV and the speed of the object exceeds a predetermined threshold. The object may be an obstacle on lane (e.g., something dropped off from another vehicle) or another vehicle moving at a much slower speed. If there is an object moving slow in front of the ADV, in operation 608, the user intention of lane changing may be considered as intentional. Otherwise, in operation 609, the user intention of lane changing is considered as unintentional.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
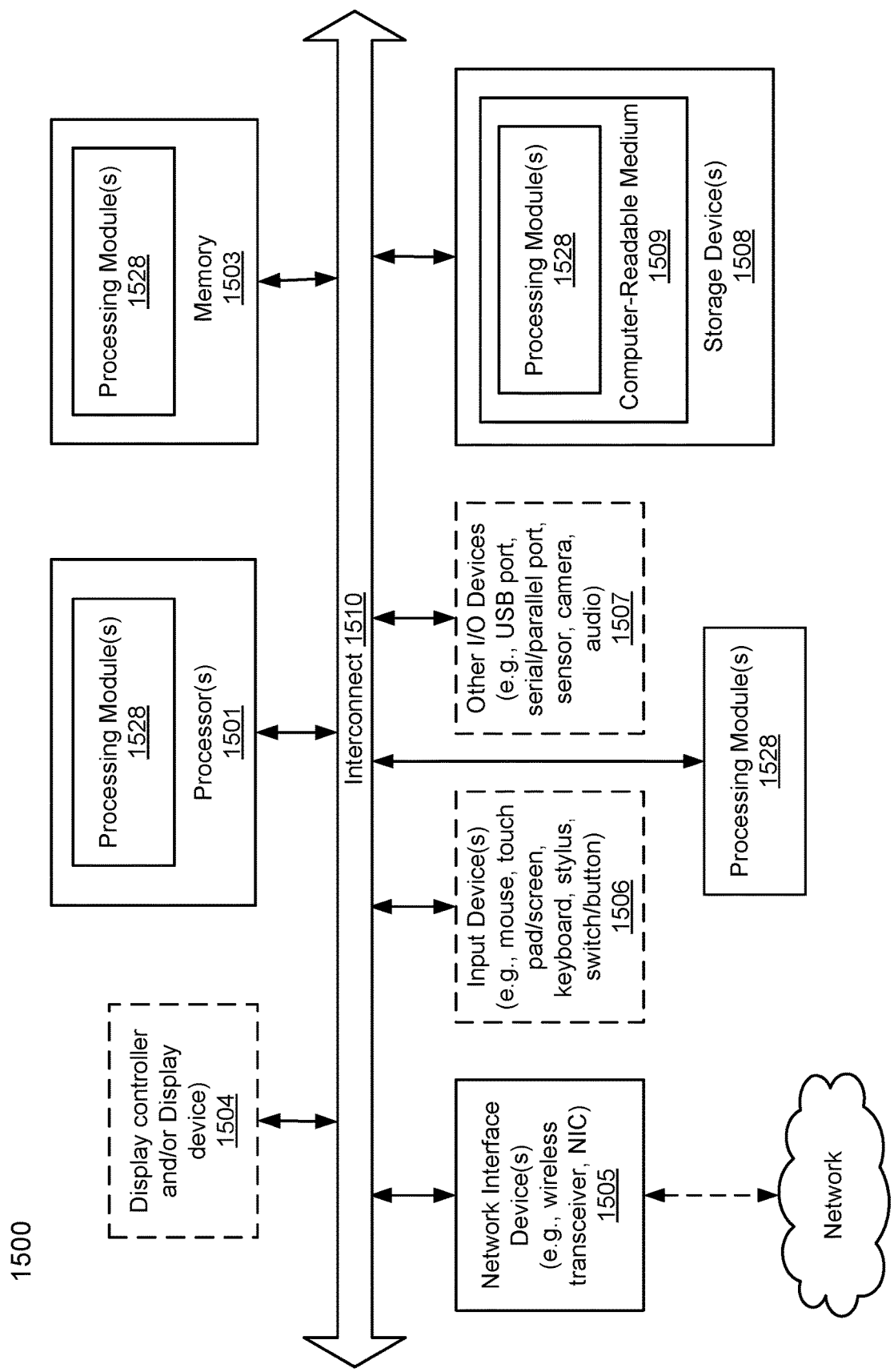
FIG. 7 is a block diagram illustrating a data processing system according to one embodiment.

FIG. 7 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, or lane assistant system 308 of FIG. 3. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle, the method comprising:
   obtaining route and map data related to a route along which an autonomous driving vehicle (ADV) is to travel;
   detecting, while traveling along the route, that the ADV is drifting towards an edge of a current lane of a road on which the ADV is moving by comparing a moving direction of the ADV against lane markings of the current lane;
   in response to detecting that the ADV is drifting towards the edge of the current lane of the road,
      determining one or more user actions performed by a driver of the ADV prior to detecting that the ADV is drifting, determining, using one or more sensors mounted on the ADV, a driving environment surrounding the ADV, the driving environment including information describing lane configuration of the road,
examining the route and map data associated with the road on which the ADV is moving to determine whether there is another lane adjacent to the current lane on the edge to which the ADV is drifting, and
determining a user intention of possible lane changing based on the user actions, the determined driving environment, and the determination of whether there is another lane adjacent to the current lane on the edge, wherein the user intention indicates that the driver does not intend to change lanes if there is no adjacent lane on the edge to which the ADV is drifting;
allowing the ADV to continue drifting towards the edge of the road if the user intention indicates that the driver intends to change lane; and
automatically modifying the moving direction of the ADV to cause the ADV to move away from the edge and to remain within the current lane if the user intention indicates that the driver does not intend to change lane.

2. The method of claim 1, wherein determining a user intention of possible lane changing comprises:
determining whether a turn signal conforming to a drifting direction has been turned on; and
indicating that the driver intends to change lane if the turn signal conforming to a drifting direction has been turned on.

3. The method of claim 1, wherein determining a user intention of possible lane changing comprises:
examining routing information associated with the current road to determine whether there is a continuing path exiting from the current lane towards a side to which the ADV is drifting; and
indicating that the driver intends to change lane if there is a continuing path exiting from the current lane towards a side to which the ADV is drifting.

4. The method of claim 1, wherein determining a user intention of possible lane changing comprises:
determining whether there is another vehicle moving at a blind spot of the ADV in an adjacent lane to which the ADV is drifting; and
indicating that the driver does not intend to change lane if there is another vehicle moving at a blind spot of the ADV in the adjacent lane to which the ADV is drifting.

5. The method of claim 1, wherein determining a user intention of possible lane changing comprises:
determining whether there is an obstacle in front of the ADV based on perception data perceiving the driving environment; and
indicating that the driver intends to change lane if there is an obstacle in front of the ADV.

6. The method of claim 5, wherein the obstacle is moving slower than the ADV, and wherein a different between a speed of the obstacle and a speed of the ADV is above a predetermined threshold.

7. The method of claim 1, wherein determining a user intention of possible lane changing comprises:
determining whether there is a rough road surface of the current lane ahead of the ADV based on sensor data obtained from one or more sensors; and
indicating that the driver intends to change lane if there is a rough road surface ahead of the ADV.

8. The method of claim 1 further comprising providing a lane departure warning alert when the user intention indicates that the driver does not intend to change lanes,
wherein automatic modification of the moving direction of the ADV is in response to not receiving correction actions from the driver within a period of time since the lane departure warning alert was provided.

9. A non-transitory machine-readable medium having instructions stored therein, which when executed by a processor, cause the processor to perform operations, the operations comprising:
obtaining route and map data related to a route along which an autonomous driving vehicle (ADV) is to travel;
detecting, while traveling along the route, that the ADV is drifting towards an edge of a current lane of a road on which the ADV is moving by comparing a moving direction of the ADV against lane markings of the current lane;
in response to detecting that the ADV is drifting towards the edge of the current lane of the road,
determining one or more user actions performed by a driver of the ADV prior to detecting that the ADV is drifting,
determining, using one or more sensors mounted on the ADV, a driving environment surrounding the ADV, the driving environment including information describing lane configuration of the road,
examining the route and map data associated with the road on which the ADV is moving to determine whether there is another lane adjacent to the current lane on the edge to which the ADV is drifting, and
determining a user intention of possible lane changing based on the user actions, the determined driving environment, and the determination of whether there is another lane adjacent to the current lane on the edge, wherein the user intention indicates that the driver does not indent to change lanes if there is no adjacent lane on the edge to which the ADV is drifting;
allowing the ADV to continue drifting towards the edge of the road if the user intention indicates that the driver intends to change lane; and
automatically modifying the moving direction of the ADV to cause the ADV to move away from the edge and to remain within the current lane if the user intention indicates that the driver does not intend to change lane.

10. The machine-readable medium of claim 9, wherein determining a user intention of possible lane changing comprises:
determining whether a turn signal conforming to a drifting direction has been turned on; and
indicating that the driver intends to change lane if the turn signal conforming to a drifting direction has been turned on.

11. The machine-readable medium of claim 9, wherein determining a user intention of possible lane changing comprises:
examining routing information associated with the current road to determine whether there is a continuing path exiting from the current lane towards a side to which the ADV is drifting; and
indicating that the driver intends to change lane if there is a continuing path exiting from the current lane towards a side to which the ADV is drifting.

12. The machine-readable medium of claim 9, wherein determining a user intention of possible lane changing comprises:
 determining whether there is another vehicle moving at a blind spot of the ADV in an adjacent lane to which the ADV is drifting; and
 indicating that the driver does not intend to change lane if there is another vehicle moving at a blind spot of the ADV in the adjacent lane to which the ADV is drifting.

13. The machine-readable medium of claim 9, wherein determining a user intention of possible lane changing comprises:
 determining whether there is an obstacle in front of the ADV based on perception data perceiving the driving environment; and
 indicating that the driver intends to change lane if there is an obstacle in front of the ADV.

14. The machine-readable medium of claim 13, wherein the obstacle is moving slower than the ADV, and wherein a different between a speed of the obstacle and a speed of the ADV is above a predetermined threshold.

15. The machine-readable medium of claim 9, wherein determining a user intention of possible lane changing comprises:
 determining whether there is a rough road surface of the current lane ahead of the ADV based on sensor data obtained from one or more sensors; and
 indicating that the driver intends to change lane if there is a rough road surface ahead of the ADV.

16. A data processing system, comprising:
 a processor; and
 a memory coupled to the processor to store instructions, which when executed by the processor, cause the processor to perform operations, the operations including
  obtaining route and map data related to a route along which an autonomous driving vehicle (ADV) is to travel;
  detecting, while traveling along the route, that the ADV is drifting towards an edge of a current lane of a road on which the ADV is moving by comparing a moving direction of the ADV against lane markings of the current lane;
  in response to detecting that the ADV is drifting towards the edge of the current lane of the road,
  determining one or more user actions performed by a driver of the ADV prior to detecting that the ADV is drifting,
  determining, using one or more sensors mounted on the ADV, a driving environment surrounding the ADV, the driving environment including information describing lane configuration of the road,
  examining the route and map data associated with the road on which the ADV is moving to determine whether there is another lane adjacent to the current lane on the edge to which the ADV is drifting, and
  determining a user intention of possible lane changing based on the user actions, the determined driving environment, and the determination of whether there is another lane adjacent to the current lane on the edge, wherein the user intention indicates that the driver does not intend to change lanes if there is no adjacent lane on the edge to which the ADV is drifting;
 allowing the ADV to continue drifting towards the edge of the road if the user intention indicates that the driver intends to change lane; and
 automatically modifying the moving direction of the ADV to cause the ADV to move away from the edge and to remain within the current lane if the user intention indicates that the driver does not intend to change lane.

17. The system of claim 16, wherein determining a user intention of possible lane changing comprises:
 determining whether a turn signal conforming to a drifting direction has been turned on; and
 indicating that the driver intends to change lane if the turn signal conforming to a drifting direction has been turned on.

18. The system of claim 16, wherein determining a user intention of possible lane changing comprises:
 examining routing information associated with the current road to determine whether there is a continuing path exiting from the current lane towards a side to which the ADV is drifting; and
 indicating that the driver intends to change lane if there is a continuing path exiting from the current lane towards a side to which the ADV is drifting.

19. The system of claim 16, wherein determining a user intention of possible lane changing comprises:
 determining whether there is another vehicle moving at a blind spot of the ADV in an adjacent lane to which the ADV is drifting; and
 indicating that the driver does not intend to change lane if there is another vehicle moving at a blind spot of the ADV in the adjacent lane to which the ADV is drifting.

20. The system of claim 16, wherein determining a user intention of possible lane changing comprises:
 determining whether there is an obstacle in front of the ADV based on perception data perceiving the driving environment; and
 indicating that the driver intends to change lane if there is an obstacle in front of the ADV.

21. The system of claim 20, wherein the obstacle is moving slower than the ADV, and wherein a different between a speed of the obstacle and a speed of the ADV is above a predetermined threshold.

22. The system of claim 16, wherein determining a user intention of possible lane changing comprises:
 determining whether there is a rough road surface of the current lane ahead of the ADV based on sensor data obtained from one or more sensors; and
 indicating that the driver intends to change lane if there is a rough road surface ahead of the ADV.

* * * * *